(12) United States Patent
D'Halluin et al.

(10) Patent No.: US 10,817,193 B2
(45) Date of Patent: Oct. 27, 2020

(54) MULTI-LAYER ENCODING FOR DISTRIBUTED CONTAINER-BASED STORAGE OF SMALLER DATA OBJECTS

(71) Applicant: Western Digital Technologies, Inc., San Jose, CA (US)

(72) Inventors: Carl Rene D'Halluin, Zwijnaarde (BE); Koen De Keyser, Sint-Denijs-Westrem (BE)

(73) Assignee: Western Digital Technologies, Inc., San Jose, CA (US)

( * ) Notice: Subject to any disclaimer, the term of this patent is extended or adjusted under 35 U.S.C. 154(b) by 216 days.

(21) Appl. No.: 15/944,751

(22) Filed: Apr. 3, 2018

(65) Prior Publication Data

US 2019/0303026 A1 Oct. 3, 2019

(51) Int. Cl.
*G06F 3/06* (2006.01)
*G06F 9/30* (2018.01)
*G06F 9/455* (2018.01)

(52) U.S. Cl.
CPC .......... *G06F 3/0631* (2013.01); *G06F 3/0644* (2013.01); *G06F 3/0667* (2013.01); *G06F 9/30029* (2013.01); *G06F 9/455* (2013.01)

(58) Field of Classification Search
CPC ............. G06F 11/1028; G06F 11/1076; G06F 11/1096; G06F 3/067; G06F 3/0689
See application file for complete search history.

(56) References Cited

U.S. PATENT DOCUMENTS

| | | | |
|---|---|---|---|
| 6,785,768 B2 | 8/2004 | Peters et al. | |
| 6,826,711 B2 | 11/2004 | Moulton et al. | |
| 8,949,695 B2 * | 2/2015 | Grube | G06F 11/1092 714/770 |
| 10,120,576 B2 | 11/2018 | Manzanares et al. | |
| 2002/0124139 A1 * | 9/2002 | Baek | G06F 11/1076 711/114 |
| 2004/0177218 A1 * | 9/2004 | Meehan | G06F 3/0616 711/114 |

OTHER PUBLICATIONS

Thonnasian, A., Multilevel RAID Disk Arrays, 2006, IEEE, 5 pages (Year: 2006).*

* cited by examiner

*Primary Examiner* — Gary W. Cygiel

(74) *Attorney, Agent, or Firm* — Patent Law Works LLP

(57) ABSTRACT

An object is divided into SD1 first-level pieces. Each first-level piece is stored in a first-level container on a first-level storage entity. A redundant encoding of the first-level containers is stored in RL1 additional first-level containers on RL1 additional first-level storage entities. On each of the first-level storage entities, the locally-stored first-level container is divided into SD2 local second-level pieces. Each second-level piece is stored in a second-level container on a second-level storage entity of the specific first-level storage entity. Each first-level storage entities contains SD2 plus RL2 second-level storage entities. A redundant encoding of the second-level containers is stored in RL2 additional second-level containers on RL2 additional second-level storage entities. The stored object is retrievable where any specific RL1 ones of the first level storage entities are not available, and any specific RL2 ones of the second-level storage entities of each remaining first-level storage entity are not available.

20 Claims, 4 Drawing Sheets

MULTI-LAYER ENCODING FOR DISTRIBUTED CONTAINER-BASED STORAGE OF SMALLER DATA OBJECTS

TECHNICAL FIELD

The present disclosure pertains generally to storage systems, and more specifically to multi-layer encoding for distributed container-based storage of smaller data objects.

BACKGROUND

The rise in electronic and digital device technology has rapidly changed the way society communicates, interacts, and consumes goods and services. Modern computing devices allow organizations and users to have access to a variety of useful applications in many locations. Using such applications results in the generation of a large amount of data. Storing and retrieving the produced data is a significant challenge associated with providing useful applications and devices.

The data generated by online services and other applications can be stored at data storage facilities. As the amount of data grows, having a plurality of users sending and requesting data can result in complications that reduce efficiency and speed. Quick and reliable access in storage systems is important for good performance.

In a storage system, it is advantageous to group a plurality of small data objects into a large object. This is especially true in distributed storage systems where data objects are replicated or erasure coded across multiple storage devices. Storing a large data object in a distributed storage system is more efficient than storing a plurality of small data objects. In practice, the storage cost of small data objects is typically higher, because storing a plurality of these small data objects increases the number of Input/output Operations Per Second (IOPS) required for storing a specific amount of data. Encoding a plurality of such small data objects also results in a higher use of the available processing power, memory, bandwidth, metadata overhead, etc. Further, in practice small data objects typically consume more than the theoretical storage capacity, because of the effects of low-level padding, such as, for example, padding for alignment to the block size of a file system or block layer.

On the other hand, certain problems arise when a distributed storage system groups a plurality of small data objects, for example into a container object which can be more advantageously stored. Even though multiple ones of the small data objects are grouped into a given container, in order to provide access to the data, input and output operations targeting individual ones of the grouped small data objects still need to be processed. In such a case, even when only one or a few individual small data objects are targeted, it is conventionally required to read, write, transfer, encode, decode, etc., one or more entire container objects. This leads to an undesired increase in the use of computing resources (e.g., processing, memory, bandwidth, etc.). This is also the case during operations in which the contents of container objects is changed, for example during a compaction operation in which a subset of data objects stored in a plurality of container objects is merged into another container object in order to reclaim storage space of deleted or obsolete data objects. Additionally, in the context of container objects grouping multiple small data objects, repair operations of storage resources, such as a broken or unavailable disk, storage node, datacenter, etc. often leads to high levels of bandwidth usage.

It would be desirable to address at least these issues.

SUMMARY

Multi-level redundant encoded distributed storage uses encoding optimizations for container-based storage of data objects. In one embodiment, two hierarchical storage levels are used, with a level-one spreading divisor (SD1) of 2, and a level-two spreading divisor (SD2) of 3. The SD for a given level n (SDn) is the number of units into which a data object is split, to be distributed across that number of storage containers on that number of n layer storage entities. The value of SD does not include the redundant encoding (e.g., the number of additional level n storage containers/storage entities used to store redundant encoded data). In other embodiments, SD1 and SD2 are set to different values (positive natural numbers other than 2 and 3). In other embodiments, more than two levels are utilized. For each of the hierarchical storage levels, a redundancy level (RL) is used (e.g., RL1 and RL2). The RL for a given level n (RLn) is the number of additional level n storage entities on which redundantly-encoded container objects are stored, such that recovery is possible when RLn level n storage entities fail.

A data object subject to multi-level redundant encoded distributed storage can be divided into SD1 first level data pieces. In some embodiments, the data object is in the form of a container object containing multiple data objects. Each specific one of the SD1 first level data pieces can be stored in a corresponding first level container object on a corresponding first level storage entity. In one embodiment, the first level storage entities are in the form of datacenters. A redundant encoding of the SD1 corresponding first level container objects can be created, for example by XORing the container objects. The redundant encoding can be stored in RL1 additional first level container objects on RL1 additional first level storage entities, resulting in SD1 plus RL1 first level container objects stored on SD1 plus RL1 first level storage entities. Thus, the data object is retrievable from any SD1 of the SD1 plus RL1 first level container objects.

In one embodiment, on each specific one of the SD1 plus RL1 first level storage entities, the locally-stored first level container object is divided into SD2 local second level data pieces. Each specific one of the SD2 local second level data pieces is stored in a corresponding second level container object on a corresponding second level storage entity of the specific first level storage entity. Second level storage entities may be in the form of storage servers, hard disks, solid state drives, or any other suitable type of storage device. In this embodiment, each specific one of the first level storage entities (e.g., datacenters) contains at least SD2 plus RL2 second level storage entities (e.g., storage servers). A redundant encoding of the SD2 second level container objects is stored in RL2 additional second level container objects on RL2 additional second level storage entities of the specific first level storage entity, resulting in SD2 plus RL2 second level container objects stored on SD2 plus RL2 second level storage entities of the specific first level storage entity. Thus, the locally-stored first level container object is retrievable from any SD2 of the SD2 plus RL2 second level container objects.

A data object subject to multi-level redundant encoded distributed storage is thus retrievable even where any RL1 ones of the SD1 plus RL1 first level storage entities are not available, and any specific RL2 ones of the SD2 plus RL2 second level storage entities of each remaining level-one storage entity are not available.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Note that the above list of features is not all-inclusive and many additional features and advantages are contemplated and fall within the scope of the present disclosure. Moreover, the language used in the present disclosure has been principally selected for readability and instructional purposes, and not to limit the scope of the subject matter disclosed herein.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The present disclosure describes technology, which may include methods, systems, apparatuses, computer program products, and other implementations, for distributed object storage with multi-layer encoding optimizations for container-based storage of small data objects. In the following description, for purposes of explanation, numerous specific details are set forth to provide a thorough understanding of the various aspects of different example embodiments. Note that any particular example embodiment may in various cases be practiced without all of the specific details and/or with variations, permutations, and combinations of the various features and elements described herein.

As described in detail below, multi-stage (e.g., nested/layered/leveled) encoded storage of container objects is utilized. In one embodiment, multi-layer redundant encoded distributed storage is implemented in two stages (layers/levels). In this embodiment, a first layer of redundant encoded distributed storage is provided at a first level of a hierarchy, and a second layer of redundant encoded distributed storage is provided at a second level of the hierarchy, the second level being positioned lower in the hierarchy than the first level. In one embodiment, the first layer is configured to tolerate failure of at least one first level storage entity, and, the second layer is configured to tolerate failure of at least one second level storage entity. The first layer could, for example, be at the level of datacenters. The second layer could, for example, be at the level of the storage servers (e.g. storage servers, hard disks, solid state drives, or any other suitable type of storage device within a datacenter). This hybrid redundant encoded distributed storage approach spread across the two levels enables foreground processes such as read and write operations to make efficient use of level-one bandwidth (e.g., between datacenters), and to achieve a desired level of redundancy spread across the storage entities. Additionally, background processes, such as repair operations and compaction operations can be executed primarily on individual level-two components, with no or a minimal usage of more expensive level-one bandwidth.

Figure 1:
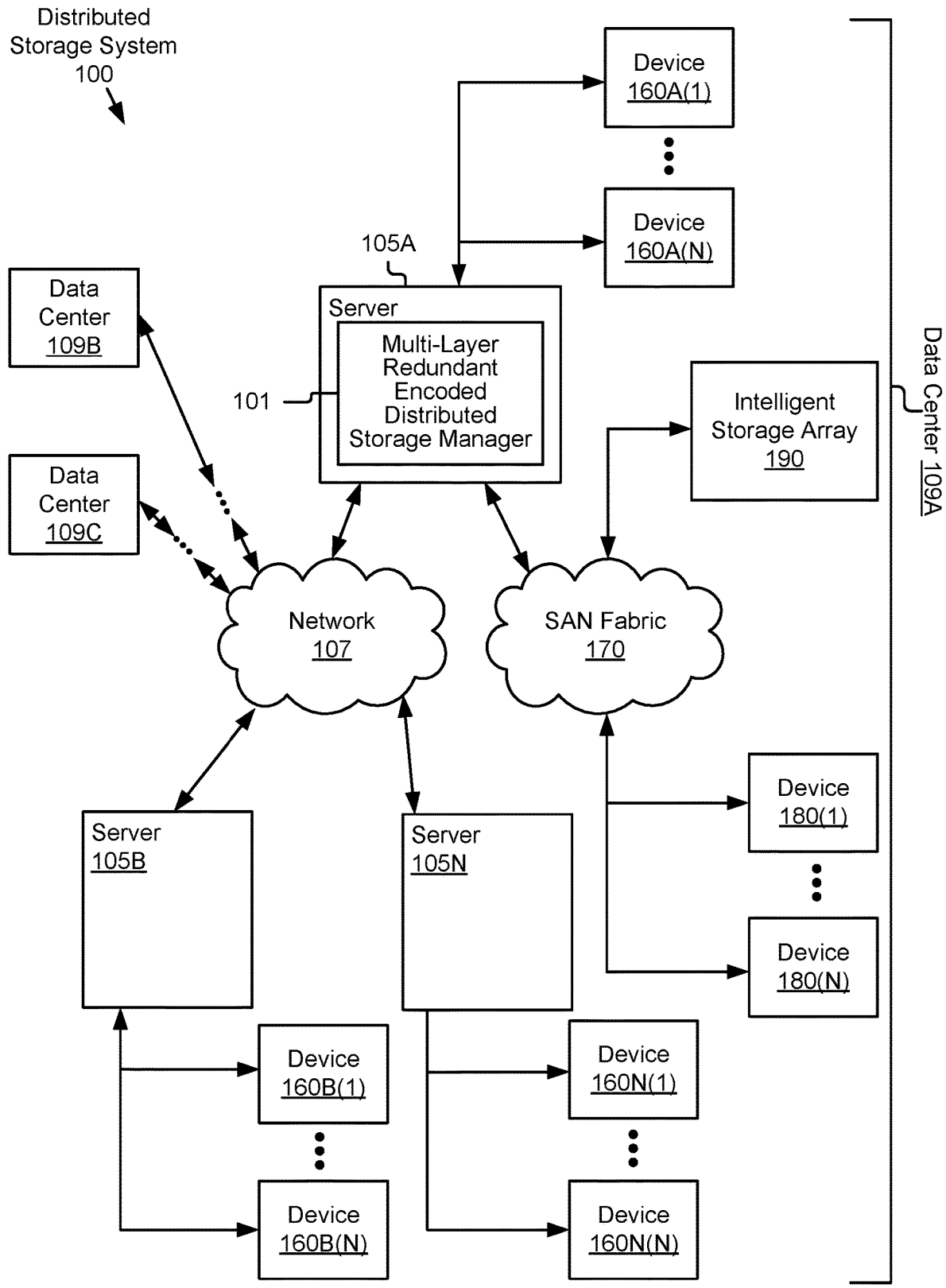
FIG. 1 is a diagram of a distributed storage system in which a multi-layer redundant encoded distributed storage manager can operate, according to one embodiment.

FIG. 1 illustrates an exemplary datacenter 109 in a distributed storage system 100 in which multi-layer redundant encoded distributed storage of container objects 203 can be implemented, according to one embodiment. In the illustrated distributed storage system 100, datacenter 109A comprises storage servers 105A, 105B and 105N, which are communicatively coupled via a network 107. A multi-layer redundant encoded distributed storage manager 101 is illustrated as residing on storage server 105A. It is to be understood that the multi-layer redundant encoded distributed storage manager 101 can reside on more, fewer or different computing devices, and/or can be distributed between multiple computing devices, as desired. In FIG. 1, storage server 105A is further depicted as having storage devices 160A(1)-(N) attached, storage server 105B is further depicted as having storage devices 160B(1)-(N) attached, and storage server 105N is depicted with storage devices 160N(1)-(N) attached. It is to be understood that storage devices 160A(1)-(N), 160B(1)-(N) and 160N(1)-(N) can be instantiated as electromechanical storage such as hard disks, solid state storage such as flash memory, tape, other types of storage media, and/or combinations of these.

Although three storage servers 105A-N each coupled to three devices 160(1)-(N) are illustrated for visual clarity, it is to be understood that the storage servers 105A-N can be in the form of rack mounted computing devices, and datacenters 109A-N can comprise many large storage racks each housing a dozen or more storage servers 105, hundreds of storage devices 160 and a fast network 107.

For visual clarity, datacenters 109B and 109N are illustrated without their corresponding storage servers 105 and storage devices 160. It is to be understood that each datacenter 105 in the distributed storage system 100 may contain large numbers of storage servers 105, storage devices 160, etc. It is also to be understood that, although FIG. 1 illustrates only three datacenters 109A-N for visual clarity, a distributed storage system 100 can be physically instantiated across more (or fewer) datacenters 109 in multiple locations, including in different cities, countries, continents, etc.

Figure 2:
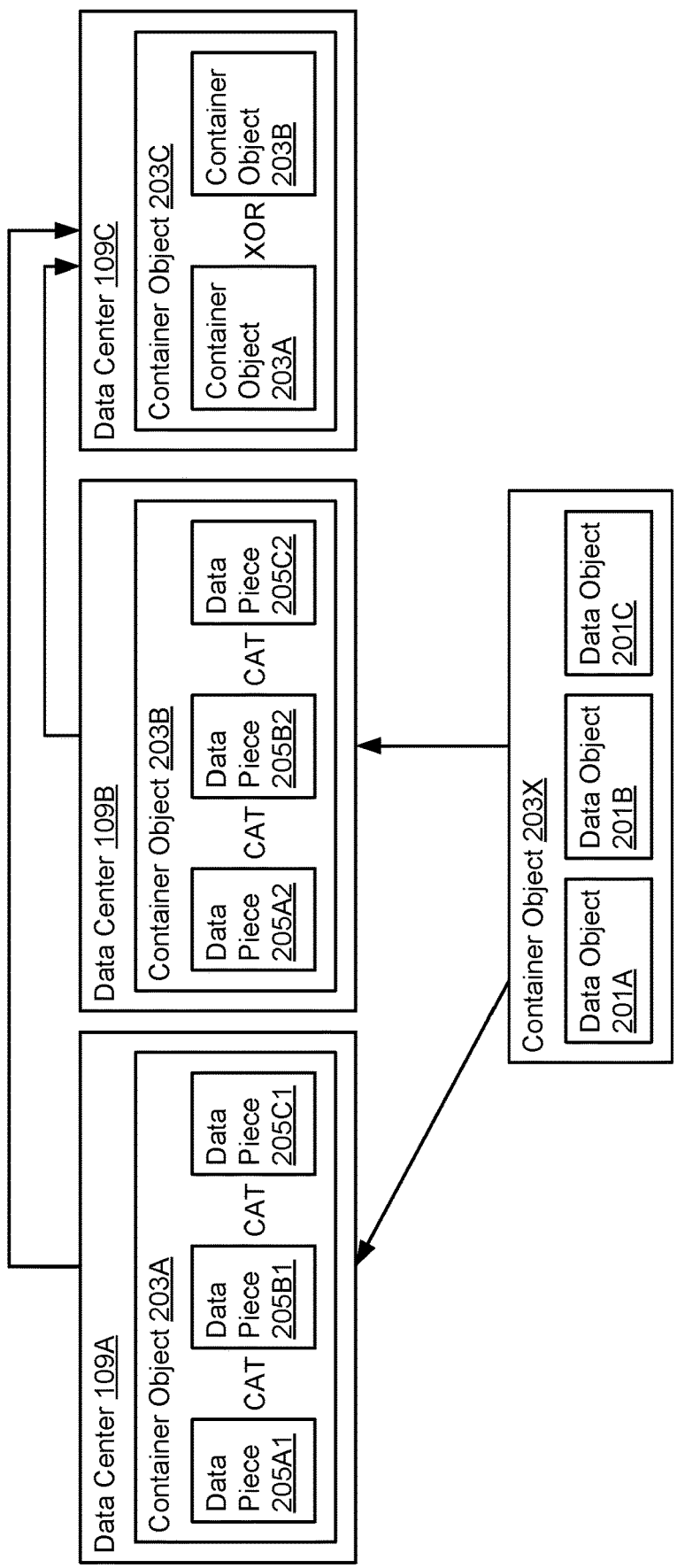
FIG. 2 is a diagram of a multi-layer redundant encoded distributed storage manager performing first layer distributed encoded redundant storage across three datacenters, according to one embodiment.
Figure 3:
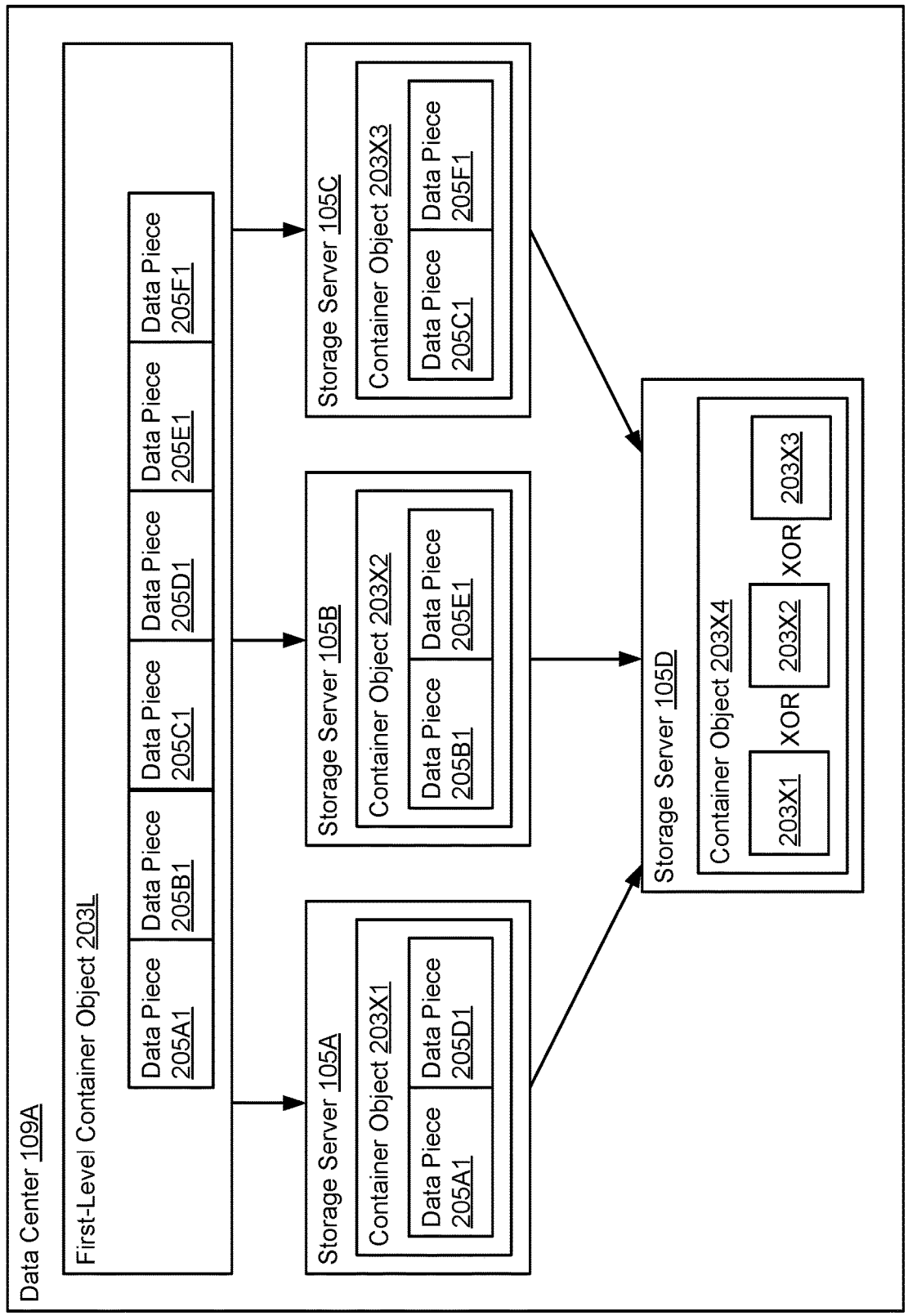
FIG. 3 is a diagram of a multi-layer redundant encoded distributed storage manager performing second layer distributed encoded redundant storage across three storage servers in a datacenter, according to one embodiment.
Figure 4:
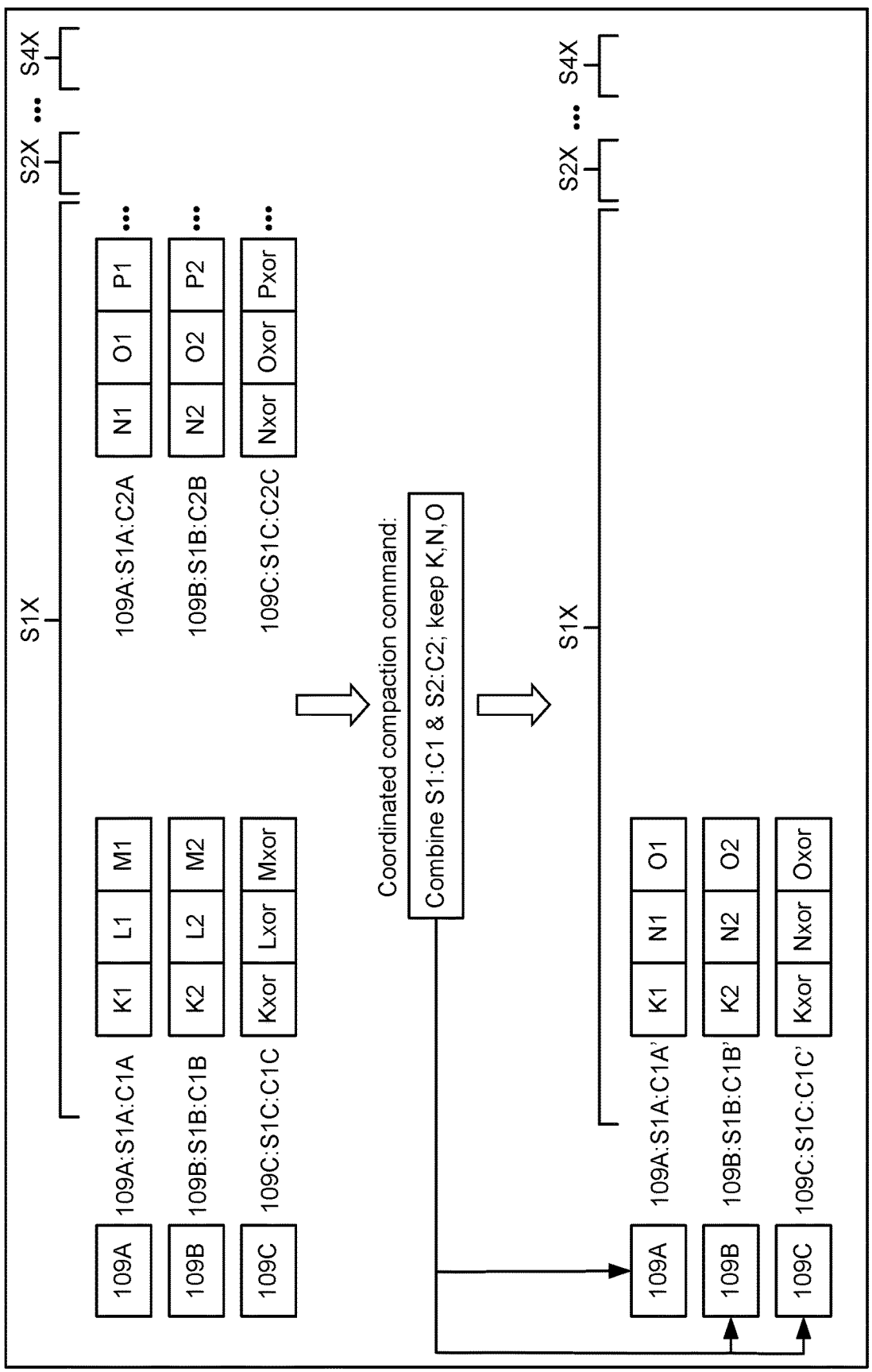
FIG. 4 is a diagram illustrating a compaction operation that merges of two container objects, according to one embodiment.

It is to be understood that although the embodiment described in conjunction with FIG. 2-4 is directed to object storage, in other embodiments the multi-layer redundant encoded distributed storage manager 101 can operate in the context of other storage architectures. As an example of another possible storage architecture according to some embodiments, server 105A is depicted as also being connected to a SAN fabric 170 which supports access to storage devices 180(1)-(N). Intelligent storage array 190 is also shown as an example of a specific storage device accessible via SAN fabric 170. As noted above, SAN 170 is shown in FIG. 1 only as an example of another possible architecture to which the multi-layer redundant encoded distributed storage manager 101 might be applied in another embodiment. In yet other embodiments, shared storage can be implemented using FC and iSCSI (not illustrated) instead of a SAN fabric 170.

Turning to FIG. 2, in one example embodiment, the multi-layer redundant encoded distributed storage manager 101 utilizes dual-layer redundant encoded storage of container objects 203. It is to be understood that this is an example number of layers, and in other embodiments more layers of encoding are utilized. In a dual-layer encoding embodiment, the first layer of redundant encoded distributed storage could for example be a 2+1 encoded storage, in which data objects 201 to be subject to redundant encoded distributed storage are split into 2 pieces and distributed across 2+1 (i.e., 3) storage entities, such that so long as any 2 of the storage entities survive, the stored data objects 201 are retrievable. In one embodiment, the first layer is at a datacenter level, in which the data from data objects 201 are spread among two datacenters 109A-B, with a third datacenter 109C storing redundant encoded data, so that the original data object 201 can survive the failure of any one of the three datacenters 109A-C, by retrieval of the data stored on the two surviving datacenters 109. As explained in more detail below, according to one embodiment, each data object 201 being stored can be split into two data pieces 205. For example, as illustrated in FIG. 2, data object 201A can be split into data pieces 205A1 and 205A2. These two data pieces 205A1-A2 are then spread among two of the datacenters 109 (109A and 109B in the example illustrated in FIG. 2). This means that each of these two datacenters (109A and 109B) stores a container object (203A and 203B respectively), containing a corresponding one of the two data pieces 205A1 and 205A2. The third datacenter 109C is then provided with a third container object 203C, containing a redundantly-encoded version of the other two container objects 203A and 203B. For example, in one embodiment the contents of the encoded container object 203C is in the form of a bitwise exclusive or ("XOR") of container objects 203A and 203B. Note that in this example container object 203A contains only data piece 205A1 and container object 203A contains only data piece 205A2. Thus, 203A XOR 203B is equivalent to 205A1 XOR 205A2 (i.e., a redundant encoding of the two data pieces making up data object 201A). So long as any two of the datacenters 109 remain available, and hence any two of the container objects 203A, 203B and 203C survive, the data object 201A can still be retrieved. If datacenter 109C fails but datacenters 109A and 109B survive, containers 203A and 203B can be retrieved from datacenters 109A and 109B respectively. These container objects 203A and 203B contain the corresponding data pieces 205A1 and 205A2, which can be concatenated, resulting in data object 201A. If datacenter 109C survives but either one or the other of datacenters 109A of 109B fails, the corresponding data piece (205A1 or 205A2) stored on the surviving one of datacenters 109A of 109B can be XORed with encoded container object 203C stored on surviving datacenter 105C, resulting in data object 201A. Thus, so long as no more than one of the level-one storage entities (datacenters 109A-C in this example) fails, any container object(s) 203 stored on the failed level-one storage entity can be restored, and hence any data object(s) (e.g., data object 201A) redundantly distributed between the level-one storage entities as described above can be retrieved.

Additional data objects 201 can be redundantly distributed across the level-one components (e.g., datacenters 109A-C) using the same functionality described above, with the additional feature that corresponding data pieces 205 are concatenated with the existing stored data pieces 205 stored on the various datacenters 109, as described below. For example, suppose a second data object 201B is stored across the three datacenters 109A-C, after the storing of data object 201A described above. The second data object 201B is split into two data pieces 205B1 and 205B2, which can be stored by datacenters 109A and 109B respectively. Note that datacenter 109A already stores container object 203A, which comprises data piece 205A1, which in turn contains the first piece 205A1 of first data object 201A. When data piece 205B1 is subsequently stored at datacenter 109A, data piece 205B1 is concatenated to the end of container object 203A, which is stored at datacenter 109A. Container object 203A, which previously contained data piece 205A1, now contains data piece 205A1 CAT data piece 205B1, where "CAT" represents concatenation.

Likewise, at datacenter 109B data piece 205B2 is concatenated to the end of container object 203B, which subsequently comprises data piece 205A2 CAT data piece 205B2. The two container objects 203A and 203B are XORed (or otherwise redundantly-encoded) and stored as container object 203C at datacenter 109C. Note that 203A XOR 203B is equivalent to (205A1 CAT 205B1) XOR (205A2 CAT 205B2), because container object 203A contains data piece 205A1 CAT data piece 205B1 and container object 203B contains data piece 205A2 CAT data piece 205B2. Note further that (205A1 CAT 205B1) XOR (205A2 CAT 205B2) is equivalent to (205A1 XOR 205A2) CAT (205B1 XOR 205B2). In another embodiment, container object 203C may be updated by XORing the two data pieces 205B1 and 205B2 of the second data object 201B (i.e., 205B1 XOR 205B2) and concatenating that to container object 203C, which comprises A1 XOR A2 prior to the addition of second data object 201B. However, because (205A1 CAT 205B1) and (205A2 CAT 205B2) already exist as container objects 203A and 203B, it saves an XOR operation to update container object 203C by XORing container object 203A with container object 203B, as described above. In any case, once container objects 203A, 203B and 203C are stored on datacenters 109A-C respectively, so long as any two of the three datacenters 109A-C remain online, data object 201A and/or data object 201B can be retrieved.

Although the above explanation describes redundant encoded distributed storage of multiple separate data objects 201, the above described functionality can also be applied to container objects 203 comprising multiple data objects 201. For example, suppose container object 203X contains data objects 201A, 201B and 201C. To store container object 203X across datacenters 109A, 109B and 109C, each data object 201A-201C in container 203X could be split into two data pieces, resulting in data pieces 205A1, 205A2, 205B1, 205B2 and 205C1 and 205C2. On datacenter 109A, the concatenation of data pieces 205A1, 205B1 and 205C1 could be stored as container object 203A. On datacenter 109B, the concatenation of data pieces 205A2, 205B2 and 205C2 could be stored as container object 203B. Finally, the XOR of container objects 203A and 203B can be stored as container object 203C on datacenter 109C. Original container object 203X (or any of the data objects therein: 203A, 203B and 203C) could then be retrieved so long as no more than one of the datacenters fail.

It is to be understood that once the container objects 203 stored on the datacenters 109 reach a given maximum size (or contain a given maximum number of data pieces 205), a new set of container objects 203 can be started, in order to contain pieces of additional data objects 201 to be subjected to redundant encoding. For example, suppose container objects 203A-C stored at datacenters 109A-C reach the given maximum size used in one particular embodiment. A new set of container objects 203D-F could then be created at the corresponding datacenters 109, and future data objects 201 to be subjected to redundant encoding would be split into pieces 205 and distributed across the new set of container objects 203D-F. The maximum size (or size range) of a container object 203 is a variable design parameter. The sizes and/or size ranges of data objects 201 and data pieces 205 are also variable design parameters.

To clarify the first layer redundant distributed encoded storage functionality described above, suppose data object 201A (for example 128 kB) is to be stored. According to one embodiment, the multi-layer redundant encoded distributed storage manager 101 would split data object 201A into two data pieces 205A1 (64 kB) and 205A2 (64 kB), and store them in container objects 203A and 203B on datacenters 109A and 109B respectively. The multi-layer redundant encoded distributed storage manager 101 would then encode (e.g., XOR) container objects 203A and 203B (containing data pieces 205A1 (64 kB) and 205A2 (64 kB) respectively), resulting in encoded container object 203C (64 kB). The multi-layer redundant encoded distributed storage manager 101 would then redundantly store container object 203C on datacenter 109C. The multi-layer redundant encoded distributed storage manager 101 would thus redundantly store data object 201A, spread across the three datacenters 109A, 109B and 109C of the distributed storage system 100 as follows:

datacenter 109A: container object 203A=data piece 205A1 datacenter 109B: container object 203B=data piece 205A2 datacenter 109C: container object 203C=[container object 203A XOR container object 203B]=[data piece 205A1 XOR data piece 205A2]

Suppose the multi-layer redundant encoded distributed storage manager 101 then stores a second data object 201B. The multi-layer redundant encoded distributed storage manager 101 could split data object 201B into data pieces 205B1 and 205B2, and redundantly store data pieces 205B1 and 205B2 distributed across the three datacenters 109A, 109B and 109C of the distributed storage system 100 as follows:

datacenter 109A: container object 203A=[data piece 205A1 CAT data piece 205B1]

datacenter 109B: container object 203B=[data piece 205A2 CAT data piece 205B2]

datacenter 109C: container object 203C=[container object 203A XOR container object 203B]=[[data piece 205A1 XOR data piece 205A2] CAT [data piece 205B1 XOR data piece 205B2]]

In this example embodiment, datacenter 109A stores container object 203A which in turn comprises a concatenation of the data piece 205A1 with data piece 205B1 (these are the first data pieces of data objects 201A and 201B respectively). The first data pieces 205X1 of any additional data objects 201X subsequently stored could then be added by concatenation to container object 203A stored at datacenter 109A. The second datacenter 109B stores a second container object 203B, which comprises the concatenation of data piece 205A2 with data piece 205B2, the second data pieces of data objects 201A and 201B. The second pieces 205X2 of any subsequently stored data objects 201X could then be concatenated to container object 203B stored at datacenter 109B. The third datacenter 109C comprises a third container object 203C, which comprises a redundantly-encoded version of the container objects 203A and 203B (e.g., 203A XOR 203B), which is in turn equivalent to a concatenation of the XOR of the data pieces 205A1 and 205A2 and the XOR of data pieces 205B1 and 205B2. This implementation of the three container objects 203A, 203B and 203C allows for retrieval of data object 201A and/or data object 201B, as long as two of the three container objects 203 survive.

It is to be understood that the example above describes the first layer of redundant encoded distributed storage being 2+1 encoded storage, in which data objects 201 to be subject to redundant encoded distributed storage are split into 2 pieces and distributed across 2+1 (i.e., 3) storage entities, such that so long as any 2 of the storage entities survive, the stored data objects 201 are retrievable. In other embodiments, the first layer of redundant encoded distributed storage can be implemented as N+1 encoded storage where N is a value greater than 2, using the same techniques described above. For example, in an embodiment in which N=3 for the first layer of redundant encoded distributed storage, data objects 201 to be subject to redundant encoded distributed storage would be split into 3 pieces and distributed across 3+1 (i.e., 4) storage entities, such that so long as any 3 of the storage entities survive, the stored data objects 201 would be retrievable.

Turning now to FIG. 3, the second layer of redundant encoded distributed storage is discussed. In one embodiment, the second layer of redundant encoded distributed storage can be implemented as (N+1)+1 encoded storage, where N is the value used in the first layer. Thus, in an embodiment where the first layer is 2+1 encoded storage as described in the example above, the second layer could be 3+1 encoded storage. It is to be understood that as 2+1 for the first layer and 3+1 for the second layer are just examples. In an example in which the second layer is 3+1 encoded storage, the container object 203 stored on each given datacenter 109A-C is split into three pieces and distributed across 3+1 (i.e., 4) separate storage elements (e.g., storage servers 105, nodes, racks, etc.) of that datacenter 109, and encoded so as to survive failure of any one storage element, by retrieval of the data stored on the three other storage elements.

FIG. 3 illustrates an example embodiment in which the second layer is 3+1 encoded storage at a storage server level, in which each first level container object $203_{FIRST\_LEVEL}$ stored on a given one of the datacenters 109 is distributed among four storage servers 105A-D in the given datacenter 109, and encoded so as to survive failure of one storage server 105 in the given datacenter 109, by retrieval of the data stored on the other three servers 105. FIG. 3 specifically illustrates four storage servers 105A-D in datacenter 109A, although it is to be understood that in this embodiment, each datacenter 109 utilizes four storage server 105 for level 2 redundant encoded distributed storage of its level 1 container objects. As explained in more detail below, according to the embodiment illustrated in FIG. 3, three second level container objects $203A\text{-}C_{SECOND\_LEVEL}$ are created, one on each of the first three storage servers 105A-C across which any first level container objects $203_{FIRST\_LEVEL}$ of datacenter 109A are being distributed. In this example, these three container objects $203A\text{-}C_{SECOND\_LEVEL}$ comprise data pieces 205 of the first level container object $203L_{FIRST\_LEVEL}$ stored in this datacenter 109A, as described in detail below. In other words, because these data pieces 205 are pieces of the local first level container object $203L_{FIRST\_LEVEL}$, they originate from data objects 201 being subjected to the first layer of redundant encoding as described above. As the data objects 201 subjected to the first layer of redundant encoding are divided into data pieces 205 which are distributed between first level container objects $203L_{FIRST\_LEVEL}$ across multiple datacenters 109A-C, the first level container objects $203L_{FIRST\_LEVEL}$ stored on each datacenter 109 are treated as data objects 201 to be subjected to second layer redundant encoding. For example, first level container object $203_{FIRST\_LEVEL}$ stored on datacenter 109A could be split into three data pieces 205A-$C_{SECOND\_LEVEL}$, and distributed among three of the storage servers 105A_C of the datacenter 109A. Each one of these three storage servers 105 thus maintains a second level container object $203A-C_{SECOND\_LEVEL}$, comprising a concatenation of a subset of the data pieces 205 of the data objects 201 (first level container objects $203L_{FIRST\_LEVEL}$) stored on that datacenter 109A. A fourth storage server 105D of the datacenter 109A stores a fourth second level container object $203D_{SECOND\_LEVEL}$, comprising a redundantly-encoded version of these three other second level container objects $203A-C_{SECOND\_LEVEL}$, for example an XOR of these three container objects $203A-C_{SECOND\_LEVEL}$. Thus, as long as any three of the four second level container objects $203A-D_{SECOND\_LEVEL}$ survive, any of the data pieces $205_{SECOND\_LEVEL}$ of the subset of data pieces $205_{SECOND\_LEVEL}$ of the data objects 201 (first level container objects $203L_{FIRST\_LEVEL}$) stored in the datacenter 109A can be retrieved.

To clarify, an example scenario including both the first and second layers of redundant encoding is described. In this example, each one of the six level 1 data objects A, B, C, D, E, and F (of example size 128 kB) are split into two data pieces of 64 kB each: A1 and A2; B1 and B2; C1 and C2; D1 and D2; E1 and E2; and F1 and F2, using the functionality explained above in conjunction with FIG. 2. (Note that the six level 1 data objects A, B, C, D, E, and F could be processed a single level 1 container object 203 containing these data objects). These data pieces are distributed among three datacenters 109A-C of distributed storage system 100, as described above. As a result, in this example scenario the first datacenter 109A stores a first level container $203L_{FIRST\_LEVEL}$ containing data pieces A1, B1, C1, D1, E1, F1, the second datacenter 109B stores a separate first level container $203B_{FIRST\_LEVEL}$ containing data pieces A2, B2, C2, D2, E2 and F2 and the third datacenter 109C stores a first level redundantly encoded container 203C containing, for example, container 203A XOR container 203B.

Thus, in the first datacenter 109A, first level container $203L_{FIRST\_LEVEL}$ comprises the subset of data pieces A1, B1, C1, D1, E1, F1. During the second layer of redundant encoding on datacenter 109A, first level container $203L_{FIRST\_LEVEL}$ is split into three sets of data pieces which are redundantly stored across four storage servers 105A-D in datacenter 109A. Referring to the four second level container objects on storage servers 105A-D as X1-X4 respectively, the second layer distributed redundant encoding could be, for example, as follows:

datacenter 109A: storage server 105A: container object X1=[A1 CAT D1]
datacenter 109A: storage server 105B: container object X2=[B1 CAT E1]
datacenter 109A: storage server 105C: container object X3=[C1 CAT F1]
datacenter 109A: storage server 105D: container object X4=[X1 XOR X2 XOR X3]

Thus, storage server 105A of datacenter 109A stores a container object X1 comprising a concatenation of the first data piece (A1) of data object A and the first data piece (D1) of data object D. Optionally, one or more additional data pieces 205 of any subsequently added data objects 201 can be added. Storage server 105B of datacenter 109A stores a second container object X2, which comprises the concatenation of the data pieces B1 and E1 (and optionally one or more other data pieces of other data objects added later). Storage server 105C of datacenter 109A stores a third container object X3, which comprises the concatenation of the data pieces C1 and F1 (and optionally additional data pieces as added). Storage server 105D of datacenter 109A stores a fourth container object X4, which comprises a redundantly-encoded version of the container objects X1, X2 and X3. According to this example embodiment, the redundantly-encoded version of X1, X2 and X3 is obtained by means of XORing the container objects (i.e., X1 XOR X2 XOR X3). Thus, the four container objects X1, X2, X3 and X4 distributed across the four storage servers 105A-D in datacenter 109 allow for retrieval of any data piece 253 of the subset of data pieces stored in datacenter 109A, as long as three of the four storage servers survive (and thus three of the four container objects are available). Any three of the four container objects X1, X2, X3 and X4 can be used to restore the damaged, destroyed or otherwise unavailable container object, and thus to retrieve any of the data pieces stored therein.

It is to be understood that the same second layer of redundant encoding is carried out in datacenters 109B and 109C. In the example scenario above, applying both the first and second layer of redundant encoding across the three datacenter 109A-C results in the following container objects being stored respectively on four storage servers (referred to below as S1$n$, S2$n$, S3$n$ and S4$n$) of each of the three datacenters:

Datacenter 109A:
Datacenter 109A: Server S1A: Container X1=[A1 CAT D1]
Datacenter 109A: Server S2A: Container X2=[B1 CAT E1]
Datacenter 109A: Server S3A: Container X3=[C1 CAT F1]
Datacenter 109A: Server S4A: Container X4=[X1 XOR X2 XOR X3]
Datacenter 109B:
Datacenter 109B: Server S1B: Container Y1=[A2 CAT D2]
Datacenter 109B: Server S2B: Container Y2=[B2 CAT E2]
Datacenter 109B: Server S3B: Container Y3=[C2 CAT F2]
Datacenter 109B: Server S4B: Container Y4=[Y1 XOR Y2 XOR Y3]
Datacenter 109C:
Datacenter 109C: Server S1C: Container Z1=[X1 XOR Y1]
Datacenter 109C: Server S2C: Container Z2=[X2 XOR Y2]
Datacenter 109C: Server S3C: Container Z3=[X3 XOR Y3]
Datacenter 109C: Server S4C: Container Z4=[Z1 XOR Z2 XOR Z3]=[X4 XOR Y4]

It is of interest to examine some parameters of the multi-layer redundant encoded distributed storage according to the scenario described above. One such parameter is spreading divisor (SD). The SD for a given level n (SDn) is the number of units into which a data object is split, to be distributed across that number of storage containers on that number of n layer storage entities. The value of SD does not include the redundant encoding (e.g., the number of additional level n storage containers/storage entities used to stored redundant encoded data).

Another parameter of interest is redundancy level (RL). The RL for a given level n (RLn) is the number of additional level n storage entities on which redundantly-encoded container objects are stored, such that recovery is possible when RLn level n storage entities fail.

In one example scenario described in conjunction with FIG. 3, the first layer of encoded storage comprises the following parameters:

The spreading divisor 1 (SD1)=2. Recall that SD1 determines the number of systematic (non-encoded) data pieces in which a data object will be split for storage in the same number of container objects spread across the same number of level 1 storage entities (e.g., datacenters 109A and 109B). Thus, in the example above in which SD1 equals 2, data object A is split into two data pieces A1 and A2, which are stored respectively in two container objects 203A and 203B. These two container objects 203A-B are in turn stored respectively on two datacenters, 109A and 109B.

The redundancy level 1 (RL1)=1. Recall that RL1 determines the number of additional level 1 storage entities (e.g., datacenters 109) on which redundantly-encoded container objects (e.g., container object 203C) are stored, such that recovery is possible when RL1 level 1 storage entities (e.g., datacenters) fail.

The second layer of encoded storage comprises the following parameters:

The spreading divisor 2 (SD2)=3. SD2 determines the number of level-two container objects across which a single level 1 container object will be spread, on the same number of level-two storage entities. Thus, in the example above in which SD2 equals 3, the level 1 container object 203L is spread across three level 2 container objects X1, X2 and X3, which are respectively stored on three on three storage servers S1A, S2A and S3A.

The redundancy level 2 (RL2)=1. RL2 determines the number of additional level 2 storage entities (e.g., storage server S4A) on which redundantly-encoded level 2 container objects (e.g., container object X4) are stored, such that recovery is possible when RL2 level 2 storage entities (e.g., storage servers) fail.

Another parameter is storage cost, which may be determined as $((SD1+RL1)/SD1)*((SD2+RL2)/SD2)$. Thus, for the example given above, the storage cost=$((2+1)/2)*((3+1)/3)=3/2*4/3=2$, which means a storage overhead of 1 or 100%.

The multi-layer encoded distributed storage system allows for recovery in case RL1 level 1 storage entities fail and additionally RL2 level 2 storage entities fail on each surviving level 1 storage entity.

In the examples above, datacenters 109 are given as the example of level 1 storage entities, and storage servers 105 as the example of level 2 storage entities. It is to be understood that different and/or additional types of storage entities can be used at different and/or additional levels in other embodiments. For example, in one embodiment storage servers 105 could be used as level 1 storage entities and storage devices 160 on a given storage server 105 could be used as level 2 storage entities. As noted above, multi-layered encoded distributed storage can be applied across more than two levels in some embodiments (for example, datacenters in different countries as level 1, sub-datacenters within given counties as level 2, storage servers within given sub-datacenters as level 3, and storage devices within given storage servers as level 4). It is also to be understood that different spreading divisors and redundancy levels can be utilized at various levels in different embodiments.

The use of the multi-layer redundant encoded distributed storage manager 101 enables efficient operations targeting container objects 203 (e.g., write, read, repair, compact) according to use of the multi-layer redundant encoded distributed storage methodology described herein. It is to be understood that level 1 bandwidth is typically more communicatively and computationally expensive to use than level 2 bandwidth, which in turn is more expensive than level 3, etc. Thinking of the nesting of levels as a hierarchy with level 1 as the top of the hierarchy, level 2 below level 1 in the hierarchy, and any subsequent levels regressively continuing in position down the hierarchy (e.g., in an embodiments in which there are, e.g., a level 3 and a level 4, level 3 would be below level 2, and level 4 would be below level 3, etc.). Storage entities higher in the hierarchy tend to be physically positioned less proximate to each other relative to those storage entities at lower levels. For example, consider an example embodiment in which level 1 is in the form clusters of datacenters, each cluster being located on a different continent, level 2 is in the form of individual datacenters, level 3 is in the form of storage servers within individual datacenters and level 4 is in the form of storage devices within individual storage servers. Different and more expensive forms of communication infrastructure are typically used to communicate between storage entities at higher levels than those at lower levels. It is more efficient at a computational and communicational level to communicate between storage devices within a single server than between different servers in a datacenter, more efficient to communicate between servers in a single datacenter than between multiple datacenters in a cluster on a given continent, and more efficient to communicate between datacenters in one such cluster than between separate clusters on different continents. Thus, it can be understood that communication between storage entities becomes more efficient at regressively lower levels of the hierarchy.

In the example embodiment illustrated in FIG. 3, it is more efficient to communicate between storage servers 105 in the same datacenter 109 (level 2) than it is to communicate between separate datacenters 109 (level 1). For this reason, it is desirable to minimize communication between storage entities at higher levels in the hierarchy (e.g., between level 1 datacenters 109 in the embodiment of FIG. 3), and push as much communication as possible to the lower levels (e.g., between level 2 storage servers 105 within the same datacenter 109 in the FIG. 3 embodiment). As explained in detail below, the use of the multi-layer redundant encoded distributed storage manager 101 enables efficient operations targeting container objects 203 by minimizing communication between higher level storage entities (e.g., level 1 storage entities), and pushes communication to lower levels (e.g., between level 2 storage entities) where practicable, according to use of the multi-layer redundant encoded distributed storage methodology described herein.

As noted above, it is also efficient and desirable to minimize the number of Input/output Operations Per Second (IOPS) when accessing stored container objects 203. It is further desirable to minimize the number of encoding and decoding operations (e.g., XOR operations), as these are computationally expensive relative to, e.g., concatenation operations. As explained in detail below, the use of the multi-layer redundant encoded distributed storage manager 101 enables operations targeting container objects 203 that minimize both TOPS and encoding/decoding operations, according to the use of the multi-layer redundant encoded distributed storage methodology described herein.

Turning to a description of specific operations, the use of the multi-layer redundant encoded distributed storage manager 101 enables efficient write operations for container objects 203 according to the methodology described above in conjunction with FIGS. 2 and 3. Referring to the scenario of FIG. 3 in which SD1=2, RL1=1, SD2=3 and RL1=1, suppose the multi-layer redundant encoded distributed storage manager 101 writes a container object containing the above-discussed six level 1 data objects A, B, C, D, E, and F (of example size 128 kB each, for a total of 764 kB) to the distributed storage system 100. According to a first write embodiment, the write operation is executed such that only 1/SD1 of the data of the level 1 data objects is sent to each of the level 1 storage entities (e.g., datacenters 109A-C), in the form of SD2 container objects for each level 1 data entity. The RL2 redundant container objects can then be encoded locally at each level 1 data entity. In the current example in which SD1=2, 1/SD1=½ or 50% of the data, which is 64 kB per object in this example scenario. Thus, only 50% of the data of the data objects A-F is sent to each datacenter 109 (e.g., 64 kB*6=384 kB), for a total of 150% of the data being transmitted to level 1 storage entities in total where SD1=2 (i.e., 50% per each of 3 datacenters=150% total). For example, level 1 container objects X1 (A1 CAT D1), X2 (B1 CAT E1) and X3 (C1 CAT F1) are sent to datacenter 109A. Likewise, container objects Y1 (A2 CAT D2), Y2 (B2 CAT E2) and Y3 (C2 CAT F2) are sent to datacenter 109B, and container objects Z1 (X1 XOR Y1), Z2 (X2 XOR Y2) and Z3 (X3 XOR Y3) are sent to datacenter 109C.

The redundantly encoded container object on each level 1 storage entity (e.g., X4 on datacenter 109A, Y4 on datacenter 109B and Z4 on datacenter 109C) can be calculated locally at each datacenter, thereby saving level 1 bandwidth. In this way, the level 1 bandwidth usage for communication between level 1 storage entities (e.g., datacenters 109) is minimized during a write operation. Furthermore, in the scenario where the write operation is initiated at one of the datacenters (e.g., datacenter 109A), only 100% of the data of the data objects 201 are transmitted to the other datacenters (e.g., 109B-C), e.g., in the form of container objects Y1-Y3 to datacenter 109B and Z1-Z3 to datacenter 109C. This is true because in the case where, e.g., datacenter 109A initiates the write operation, the level 1 data objects to be written are already present on datacenter 109A, and thus no transmission to datacenter 109A needs to be executed.

In another embodiment, different write methodology is utilized, in which the encoded redundant containers are calculated by the entity that initiates the write operation, rather than locally at the level 1 storage entities. In this embodiment, (1+(RL2/SD2))/SD1 of the data of the level 1 data objects 201 is sent to each of the level 1 storage entities, in the form of (SD2+RL2) container objects 203 for each level 1 storage entity. In the example given above, (1+(⅓))/2=⅔ or 66% of the data of the set of level 1 data objects is sent to each datacenter in the form of 4 container objects for each datacenter (e.g., X1, X2, X3, X4 to 109A). Although less efficient than the first write embodiment, this second write embodiment still provides for a reduced bandwidth usage at the level of the level 1 storage entities (50%<66%<100%). It is further the case that, in the example shown above, where the second embodiment write operation is initiated at one of the datacenters (e.g., datacenter 109A), only ⁴⁄₃ or 133% of the data in total is transmitted to the other datacenters (e.g., 109B-C) in the form of container objects (e.g., Y1-Y4 and Z1-Z4).

By making use of container objects 203 rather than operating on individual data pieces 205, the number of TOPS that occur when accessing stored data is reduced compared to a conventional model, because the TOPS occur once for each container object 203 rather than for each data piece 205 inside the container object 203 (e.g., level 1 data pieces being sent to a given datacenter to be stored as a container object can be concatenated prior to transmission, and subsequently read or otherwise access a container object). The number of encoding/decoding operations is also limited.

The use of the multi-layer redundant encoded distributed storage manager 101 also enables efficient read operations for retrieval of a data object from a container object. A read request for a given data object (e.g., A) processed by a level 1 storage entity (e.g., datacenter 109A) storing a level 1 container object (e.g., X1) containing a systematic (non-encoded) data piece (e.g., A1) of the targeted data object can be handled without any decoding operations, and with a minimal usage of level 1 bandwidth. According to the specific example scenario under discussion, a read request for data object A arriving at datacenter 109A could be processed by retrieval of data piece A1 locally at datacenter 109A, and the retrieval of remote data piece A2 from datacenter 109B. Thus, only 50% of the size of the data object A would be transmitted across level 1 bandwidth (e.g., data piece A2 which is 50% of the size of A is transmitted from datacenter 109B to datacenter 109A). Further, no decoding (e.g., XOR) operations are needed, since A1 and A2 can simply be concatenated, resulting in data object A. This same process could be used where a read request for data object A arrives at datacenter 109B (e.g., A1 transmitted from datacenter 109A to datacenter 109B, A2 retrieved locally at datacenter 109B).

Consider now the case of a read request processed by a level 1 storage entity storing a level 1 container object that does not contain a systematic data piece, but instead only an encoded data piece, of the data object being targeted. Such a read request can be handled according to at least two separate possible embodiments, described in detail below. These two embodiments are described herein in the context of the example storage scenario of FIG. 3, using an example read request for data object A that arrives at datacenter 109C.

In one embodiment, a single systematic data piece (e.g., either A1 or A2) is retrieved from a remote datacenter (e.g., either 109A or 109B), and the relevant encoded data piece (e.g., Z1) is retrieved locally on datacenter 109C. The second systematic data piece is reconstructed by the use of a single decoding (e.g., XOR) operation involving the encoded data piece and the remotely retrieved systematic data piece, resulting in the second systematic data piece. The two systematic data pieces can then be concatenated, resulting in the target data object. In this embodiment according to this example scenario, the read operation involves utilizing level 1 bandwidth only to transmit 50% of the size of the data object (one systematic data piece) from datacenter 109A or 109B to datacenter 109C. Only a single decoding operation is then executed at datacenter 109C.

According to a second read embodiment, the datacenter (e.g., 109C) lacking local systematic data pieces may retrieve both systematic data pieces (e.g., A1 and A2) from the remote datacenters (e.g., 109A and 109B). In this embodiment, 100% of the size of the data object is transmitted across level 1 bandwidth, although no decoding (e.g., XOR) operations are required to assemble the data object (e.g., A).

A read request in the context of failure or outage of a level 2 storage entity (e.g., a storage server 105 of a particular datacenter 109), does not necessitate an increase of level 1 bandwidth usage relative to any other read request. This is so because in the event of a failure of a specific level 2 storage entity in the given level 1 storage entity receiving the read request, any piece of data stored on the failed storage server can be recreated without retrieving data from the other datacenters, as explained above in conjunction with FIG. 3. For example, suppose a specific level 2 storage element (e.g., storage server S1A) is unavailable when the read request for data object A is processed at the receiving level 1 storage element (e.g., datacenter 109A). The data piece A1 can be reconstructed locally at datacenter 109A, by locally retrieving the container objects X2, X3 and X4 from the surviving local storage servers 105S2-S4, and performing a decoding operation resulting in container X1, from which data piece A1 can be retrieved. The other systematic data piece, for example A2, can be retrieved from datacenter 109B, such that the level 1 bandwidth remains at 50% of the size of data object A. The extra processing necessitated by the failure of the level 2 storage entity is in the form of level 2 bandwidth and the extra decoding operation.

A read request in the context of the failure or outage of a level 1 storage entity does not lead to an increase of the level 1 bandwidth usage either. According to the example discussed above, a read request arriving at, e.g., datacenter 109A in case of failure of, e.g., datacenter 109B can be handled by means of retrieval of a data piece from datacenter 109C instead in combination with the relevant decoding to recreate the data piece from the unavailable datacenter (e.g., A2 from 109B), thereby using level 1 bandwidth of 50% of the size of the data object A, in order to transmit the relevant encoded data from 109C to 109A.

Using the methodology discussed herein, efficient repair operations are also possible, in the event of, for example, RL2 failed level 2 storage entities, or RL1 level 1 storage entities. Note that in the example repair operations described in detail herein, SD1 equals 2, SD2 equals 3, and RL1 and RL2 equal 1. As described above, in different embodiments other spreading divisors and redundancy levels can be utilized. The specific example of repair operations described in detail herein can be generalized for cases with other spreading divisors by reading SD1-K non encoded pieces, and K encoded pieces, where K can be any non-negative natural number greater than or equal to zero and less than or equal to RL1.

A failure of RL2 level 2 storage entities per level 1 storage entity can be repaired locally at each level 1 storage entity, without the need for the usage of any level 1 bandwidth. According to the example above in which RL2=1, a failure of 1 storage server 105 can be repaired locally at each datacenter 109, without the need for usage of any data of the other datacenters 109, using the data on the remaining local storage server 105 as described above in conjunction with FIG. 3.

In case of failure of RL1 level 1 storage entities (e.g., 1 datacenter in the above example in which RL1=1), the data to reconstruct the content on SD2 level 2 storage entities of the RL1 failed level 1 storage entities (e.g., 3 storage servers on 1 failed datacenter in the given example, in which SD2=3) are retrieved from surviving level 1 storage entities (e.g., the remaining 2 datacenters), thereby consuming some level 1 bandwidth. The additional RL2 level 2 storage entities of the RL1 failed level 1 storage entities (e.g., the 1 storage server storing the encoded data of the 1 failed datacenter in the example in which RL2=1) can then be restored locally by encoding the data of the reconstructed SD2 level 2 storage entities (e.g., 3 storage servers), without the need for consumption of any additional level 1 bandwidth.

For example, suppose datacenter 109C fails, in the example described above. Datacenter 109C stores 4 container objects Z1-Z4 spread across 4 storage servers S1C-S4C. The repair operation could be completed by retrieving data for repairing container objects Z1-Z3 from the other datacenters 109A and 109B, and subsequently locally generating the data for Z4 from these repaired container objects Z1-Z3 by performing the relevant encoding. According to this example, repair of Z1, Z2 and Z3 would rely on retrieval of X1, X2 and X3 from datacenter 109A and Y1, Y2 and Y3 from datacenter 109B. Container object Z4 could then be repaired locally. Thus, for the repair of 4 container objects (Z1-Z4), a level 1 bandwidth usage of 6 container objects (X1-X3 and Y1-Y3) would be used. According to this example an entire datacenter (109C) could be repaired by means of a level 1 bandwidth usage of 150% (6 container objects) of the stored data (4 container objects) of the datacenter (109C).

It is to be further understood that in case of failure of more than RL2 level 2 storage elements, the level 1 bandwidth usage can be optimized in a similar way as described above. For example, in case of failure of two or three storage servers of a given datacenter, the failed storage servers could be repaired by retrieval of sufficient container objects from remote datacenters to respectively repair one or two storage servers, while the last storage server could then be repaired locally without consuming level 1 bandwidth.

Turning now to FIG. 4, the operation of an efficient compaction operation according to the use of redundant distributed encoded storage functionality is described herein. As explained below in conjunction with FIG. 4, the multi-layer redundant encoded distributed storage manager 101 enables efficient compaction of multiple container objects, which can be executed without the need for consumption of level 1 bandwidth. Note that it might be desirable to compact container objects, for example by merging two container objects into one after some data pieces contained in the container objects being compacted have been deleted or otherwise have become obsolete. Note that in the example of efficient compaction described in detail herein, SD1 equals 2, SD2 equals 3, and RL1 and RL2 equal 1. As described above, in different embodiments other spreading divisors and redundancy levels can be utilized. The specific example of compaction operations described in detail herein can be generalized for cases with other spreading divisors by reading SD1-K non encoded pieces, and K encoded pieces, where K can be any non-negative natural number greater than or equal to zero and less than or equal to RL1.

In a similar example to that of FIG. 3, FIG. 4 illustrates a (2+1)×(3+1) multi-layer encoding scheme comprising three level 1 datacenters 109A-C, each comprising four level 2 storage servers S1X-S4X, wherein X is the letter of the associated datacenter (only the contents of S1X are shown in detail in FIG. 4 for visual clarity). Each storage server SnX stores two container objects C1X and C2X, where n is the number of the given storage server {1, 2, 3, 4}. In this scenario there is a 2+1 level 1 encoding of data objects K, L and M in container objects 109A:S1A:C1A, 109B:S1B:C1B and 109C:S1C:C1C, in which datacenters 109A and 109B store the systematic data pieces of these data objects, while datacenter 109C stores an encoded data piece providing for the requisite level of level 1 redundancy. Similarly, data objects N, O, P are stored in container objects 109A: S1A:C2A, 109B:S1B:C2B and 109C:S1C:C2C.

The second level of 3+1 encoding, as explained above in conjunction with FIG. 3 ensures that datacenters 109A, 109B and 109C respectively contain storage servers S4A, S4B and S4C, respectively storing encoded container objects S4A:C1A, S4B:C1B and S4C:C1C, each comprising the results of XORing (or preforming another encoding operation) the respective set of other container objects stored on the other three storage servers of the respective datacenter. For example 109A:S4A:C1A=(109A:S1A:C1A XOR 109A:S2A:C1A XOR 109A:S3A:C1A). This provides the desired level of level 2 redundancy.

As shown in FIG. 4, after a deletion of, e.g., data objects L, M and P, space can be reclaimed in the distributed storage system by means of a compaction operation. Such a compaction operation could merge those container objects 203 containing deleted and/or otherwise sufficiently obsolete data pieces, resulting in a single, new merged container object 203' containing the remaining data pieces of those data objects that are still active from the container objects that were merged. As illustrated, according to this example the deletion of data objects L and M affects two of the three data pieces of container objects C1X on storage elements S1X of the three datacenters 109A, 109B and 109C. Deletion of data object P affects one of the three data pieces of container objects C2X on storage servers S1X of the three datacenters 109A, 109B and 109C. Container objects C1X thus each contain two data pieces which are obsolete and can be deleted (and one which remains active), while container objects C2X each contain one data piece which can be deleted and two data pieces which are to remain retrievable. Thus, container objects C1X and C2X can be merged to new container objects C1X', each containing three data pieces.

Focusing on the merging activity occurring on storage server S1A for clarity of explanation, as illustrated the three datacenters 109A, 109B and 109C can execute the compaction command locally. On datacenter 109A, 109A:S1A:C1A' only uses data from 109A:S1A:C1A, and 109A:S1A:C2A. On data center 109B, 109B:S1B:C1B' only uses data from 109B:S1B:C1B and 109B:S1B:C2B. Likewise, on datacenter 109C, 109C:S1C:C1C' only uses data from 109C:S1C:C1C and 109C:S1C:C2C. Thus, there is no need for usage of level 1 bandwidth for execution of the compaction operation. Instead, a compaction command can be provided to each of the datacenters, and the compaction operation can be executed in parallel on the datacenters locally. Note that the creation of 109A:S1A:C1A' on storage element S1A of datacenter 109A will also affect the data of the related container object 109A:S4A:C1A', which equals 109A:S1A:C1A' XOR 109A:S2A:C1A' XOR 109A:S3A:C1A'. However, this modification can be handled locally at datacenter 109A without consumption of level 1 bandwidth, and with usage of minimal processing power by means of a minimal number of XOR encoding operations and usage of minimal TOPS as the operations are performed on container objects.

The compaction operation can thus be initiated by sending a coordinated compaction command to each of the level 1 storage entities, such as for example ContainerObjectMerged=merge (ContainerObject1, ContainerObject2, [data objects to keep]). The command can then be executed at each of the level 1 entities in parallel. Synchronization during the compaction operation is not a necessity. By means of maintaining a suitable offset map during the compaction operation it is possible for example to execute the compaction command in an unsynchronized way, for example one level 1 entity at a time, or in any other way desired.

In one embodiment as in the example shown in FIG. 4, container objects 203 are merged to form a new container object 203' of the same size during a compaction operation. However, in other possible embodiments, container objects may be reduced (or expanded) in size during such a compaction operation, as desired.

FIGS. 1-3 illustrate a multi-layer redundant encoded distributed storage manager 101 residing on a single storage server 105. It is to be understood that this is just an example. The functionalities of the multi-layer redundant encoded distributed storage manager 101 can be implemented on other computing devices in other embodiments, or can be distributed between multiple computing devices. It is to be understood that although the multi-layer redundant encoded distributed storage manager 101 is illustrated in FIG. 1 as a standalone entity, the illustrated multi-layer redundant encoded distributed storage manager 101 represents a collection of functionalities, which can be instantiated as a single or multiple modules on one or more computing devices as desired.

It is to be understood the multi-layer redundant encoded distributed storage manager 101 can be instantiated as one or more modules (for example as object code or executable images) within the system memory 217 (e.g., RAM, ROM, flash memory 254) of any computing device, such that when the processor 214 of the computing device processes a module, the computing device executes the associated functionality. As used herein, the terms "computer system," "computer," "client," "client computer," "server," "server computer" and "computing device" mean one or more computers configured and/or programmed to execute the described functionality. Additionally, program code to implement the functionalities of the multi-layer redundant encoded distributed storage manager 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in enough detail to enable the disclosed teachings to be practiced. Other embodiments may be used and derived therefrom, such that structural and logical substitutions and changes may be made without departing from the scope of this disclosure. The Detailed Description, therefore, is not to be taken in a limiting sense, and the scope of various embodiments is defined by the below claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. The illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others to best utilize the various example embodiments with various modifications as are suited to the particular use contemplated.

Note that, although the terms "first," "second," and so forth may be used herein to describe various elements, these elements are not to be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for describing particular example embodiments only and is not intended to be limiting. As used in the description of the example embodiments and the appended claims, the singular forms "a," "an," and "the" are intended to include the plural forms as well, unless the context clearly indicates otherwise. Also note that the term "and/or" as used herein refers to and encompasses any and/or all possible combinations of one or more of the associated listed items. Furthermore, the terms "comprises" and/or "comprising," when used in this specification, specify the presence of stated features, integers, blocks, steps, operations, elements, and/or components, but do not preclude the presence or addition of one or more other features, integers, blocks, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As will be understood by those skilled in the art, the invention may be embodied in other specific forms without departing from the spirit or essential characteristics thereof. Likewise, the particular naming and division of the portions, modules, servers, managers, components, functions, procedures, actions, layers, features, attributes, methodologies, data structures and other aspects are not mandatory or significant, and the mechanisms that implement the invention or its features may have different names, divisions and/or formats. The foregoing description, for the purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer-implemented method, comprising:
    setting a level-one spreading divisor (SD1) to a first positive natural number;
    setting a level-two spreading divisor (SD2) to a second positive natural number;
    dividing a data object into SD1 first-level data pieces, wherein the data object is subject to multi-level redundant encoded distributed storage;
    storing each specific one of the SD1 first-level data pieces in a corresponding first-level container object on a corresponding first-level storage entity;
    storing a redundant encoding of the corresponding first-level container objects in additional first-level container objects of level-one redundancy level (RL1) on additional first-level storage entities of RL1, thereby resulting in SD1 plus RL1 first-level container objects stored on SD1 plus RL1 first-level storage entities, wherein the data object is retrievable from any SD1 of the SD1 plus RL1 first-level container objects; and
    on each specific one of the SD1 plus RL1 first-level storage entities:
        dividing a locally-stored first-level container object into SD2 local second-level data pieces;
        storing each specific one of the SD2 local second-level data pieces in a corresponding second-level container object on a corresponding second-level storage entity of the specific first-level storage entity, wherein each specific one of the first-level storage entities further comprises SD2 plus second-level storage entities of level-two redundancy level (RL2); and
        storing a redundant encoding of the corresponding second-level container objects in RL2 additional second-level container objects on RL2 additional second-level storage entities of the specific first-level storage entity, thereby resulting in SD2 plus RL2 second-level container objects stored on SD2 plus RL2 second-level storage entities of the specific first-level storage entity, wherein the locally-stored first-level container object is retrievable from any SD2 of the SD2 plus RL2 second-level container objects;
    wherein the data object is retrievable in a circumstance in which any specific one of the SD1 plus RL1 first-level storage entities is not available, and any specific one of the SD2 plus RL2 second-level storage entities of each available first-level storage entity is not available.

2. The computer-implemented method of claim 1, wherein:
   each first-level storage entity comprises a datacenter; and
   each second-level storage entity comprises a storage server, a hard disk, or a solid state drive in a corresponding datacenter.

3. The computer-implemented method of claim 1, further comprising:
   maintaining a distributed storage system comprising SD1 plus RL1 first-level storage entities, and further comprising SD2 plus RL2 second-level storage entities in each first-level storage entity.

4. The computer-implemented method of claim 1, further comprising:
   setting a level-three spreading divisor (SD3) to a third positive natural number;
   maintaining a distributed storage system comprising SD1 plus RL1 first-level storage entities, SD2 plus RL2 second-level storage entities in each first-level storage entity, and SD3 plus third-level storage entities of level-three redundancy level (RL3) in each second-level storage entity; and
   on each specific one of the SD2 plus RL2 second-level storage entities:
      dividing a locally-stored second-level container object into SD3 local third-level data pieces;
      storing each specific one of the SD3 local third-level data pieces in a corresponding third-level container object on a corresponding third-level storage entity of the specific second-level storage entity, wherein each specific one of the second-level storage entities further comprises SD3 plus RL3 third-level storage entities; and
      storing a redundant encoding of the corresponding third-level container objects in RL3 additional third-level container objects on RL3 additional third-level storage entities of the specific second-level storage entity, thereby resulting in SD3 plus RL3 third-level container objects stored on SD3 plus RL3 third-level storage entities of the specific second-level storage entity;
      wherein the locally-stored second-level container object is retrievable from any SD3 of the SD3 plus RL3 third-level container objects.

5. The computer-implemented method of claim 1, wherein storing a redundant encoding of multiple container objects further comprises:
   performing a bitwise exclusive or (XOR) of the multiple container objects; and
   storing results of the performed bitwise XOR.

6. The computer-implemented method of claim 1, wherein storing a redundant encoding of multiple container objects further comprises:
   performing an erasure encoding of the multiple container objects; and
   storing results of the erasure encoding.

7. The computer-implemented method of claim 1, further comprising:
   dividing a second data object into SD1 first-level data pieces, wherein the second data object is subject to multi-level redundant encoded distributed storage; and
   concatenating each specific one of the SD1 first-level data pieces of the second data object to a corresponding first-level container object on a corresponding first-level storage entity.

8. The computer-implemented method of claim 1, further comprising:
   dividing the data object subject to multi-level redundant encoded distributed storage into SD1 sets of first-level data pieces;
   storing each specific one of the SD1 sets of first-level data pieces in a corresponding first-level container object on a corresponding first-level storage entity; and
   on each specific one of the SD1 plus RL1 first-level storage entities:
      dividing a locally-stored first-level container object comprising a set of first-level data pieces into SD2 local subsets of first-level data pieces; and
      storing each specific one of the SD2 local subsets of first-level data pieces in a corresponding second-level container object on a corresponding second-level storage entity of the specific first-level storage entity.

9. The computer-implemented method of claim 1, further comprising:
   setting a value (K) to a natural number greater than or equal to zero and less than or equal to RL1.

10. The computer-implemented method of claim 9, further comprising:
    retrieving the data object subject to multi-level redundant encoded distributed storage from SD1 of the first-level storage entities.

11. The computer-implemented method of claim 10, further comprising:
    retrieving SD1 minus K data pieces of the data object from SD1 minus K first-level container objects on SD1 minus K first-level storage entities;
    retrieving K redundant encodings of K data pieces of the data object from K first-level container objects on K first-level storage entities;
    decoding K data pieces of the data object using the K redundant encodings and the SD1 minus K retrieved data pieces; and
    concatenating the SD1 minus K retrieved data pieces and the K decoded data pieces of the data object.

12. The computer-implemented method of claim 9, further comprising:
    replacing a failed first-level storage entity storing a first-level redundantly-encoded container object, wherein replacing the failed first-level storage entity further comprises:
       retrieving SD1 minus K first-level container objects containing non-encoded data from SD1 minus K first-level storage entities; and
       retrieving K redundantly-encoded first-level container objects from K first-level storage entities.

13. The computer-implemented method of claim 12, further comprising:
    creating a first-level redundantly-encoded container object by performing an encoding operation on the SD1 minus K retrieved first-level container objects; and
    storing the first-level redundantly-encoded container object on an additional first-level storage entity.

14. The computer-implemented method of claim 12, further comprising:
    decoding an additional first-level container object containing non-encoded data, using the SD1 minus K retrieved first-level container objects containing non-encoded data and the K retrieved redundantly-encoded first-level container objects; and
    storing the additional first-level container object containing non-encoded data on an additional first-level storage entity.

15. The computer-implemented method of claim 1, further comprising:
setting SD1 to 2; and
setting SD2 to 3.

16. The computer-implemented method of claim 15, further comprising:
retrieving a data object subject to multi-level redundant encoded distributed storage from two of the first-level storage entities.

17. The computer-implemented method of claim 16, further comprising:
retrieving a first data piece of the data object from a first first-level container object on a first first-level storage entity;
retrieving a second data piece of the data object from a second first-level container object on a second first-level storage entity; and
concatenating the first and the second retrieved data pieces of the data object.

18. The computer-implemented method of claim 16, further comprising:
retrieving a first data piece of the data object from a first first-level container object on a first first-level storage entity;
retrieving a redundant encoding of a first data piece and a second data piece of the data object from a second first-level container object on a second first-level storage entity;
decoding the second data piece of the data object using the redundant encoding and the first retrieved data piece; and
concatenating the first and the second data pieces of the data object.

19. A storage system, comprising:
a processor; and
a storage manager stored on a memory and executable by the processor, the storage manager configured to:
set a level-one spreading divisor (SD1) to a first positive natural number;
set a level-two spreading divisor (SD2) to a second positive natural number;
divide a data object into SD1 first-level data pieces, wherein the data object is subject to multi-level redundant encoded distributed storage;
store each specific one of the SD1 first-level data pieces in a corresponding first-level container object on a corresponding first-level storage entity;
store a redundant encoding of the corresponding first-level container objects in additional first-level container objects of level-one redundancy level (RL1) on additional first-level storage entities of RL1, thereby resulting in SD1 plus RL1 first-level container objects stored on SD1 plus RL1 first-level storage entities, wherein the data object is retrievable from any SD1 of the SD1 plus RL1 first-level container objects; and
on each specific one of the SD1 plus RL1 first-level storage entities:
divide a locally-stored first-level container object into SD2 local second-level data pieces;
store each specific one of the SD2 local second-level data pieces in a corresponding second-level container object on a corresponding second-level storage entity of the specific first-level storage entity, wherein each specific one of the first-level storage entities further comprises SD2 plus second-level storage entities of level-two redundancy level (RL2); and
store a redundant encoding of the corresponding second-level container objects in RL2 additional second-level container objects on RL2 additional second-level storage entities of the specific first-level storage entity, thereby resulting in SD2 plus RL2 second-level container objects stored on SD2 plus RL2 second-level storage entities of the specific first-level storage entity, wherein the locally-stored first-level container object is retrievable from any SD2 of the SD2 plus RL2 second-level container objects;
wherein the data object is retrievable in a circumstance in which any specific one of the SD1 plus RL1 first-level storage entities is not available, and any specific one of the SD2 plus RL2 second-level storage entities of each available first-level storage entity is not available.

20. An apparatus, comprising:
a processor; and
a storage manager stored on a memory and executable by the processor, the storage manager comprising:
means for setting a level-one spreading divisor (SD1) to a first positive natural number;
means for setting a level-two spreading divisor (SD2) to a second positive natural number;
means for dividing a data object into SD1 first-level data pieces, wherein the data object is subject to multi-level redundant encoded distributed storage;
means for storing each specific one of the SD1 first-level data pieces in a corresponding first-level container object on a corresponding first-level storage entity;
means for storing a redundant encoding of the corresponding first-level container objects in additional first-level container objects of level-one redundancy level (RL1) on additional first-level storage entities of RL1, thereby resulting in SD1 plus RL1 first-level container objects stored on SD1 plus RL1 first-level storage entities, wherein the data object is retrievable from any SD1 of the SD1 plus RL1 first-level container objects; and
on each specific one of the SD1 plus RL1 first-level storage entities:
means for dividing a locally-stored first-level container object into SD2 local second-level data pieces;
means for storing each specific one of the SD2 local second-level data pieces in a corresponding second-level container object on a corresponding second-level storage entity of the specific first-level storage entity, wherein each specific one of the first-level storage entities further comprises SD2 plus second-level storage entities of level-two redundancy level (RL2); and
means for storing a redundant encoding of the corresponding second-level container objects in RL2 additional second-level container objects on RL2 additional second-level storage entities of the specific first-level storage entity, thereby resulting in SD2 plus RL2 second-level container objects stored on SD2 plus RL2 second-level storage entities of the specific first-level storage entity, wherein the locally-stored first-level container object is retrievable from any SD2 of the SD2 plus RL2 second-level container objects;

wherein the data object is retrievable in a circumstance in which any specific one of the SD1 plus RL1 first-level storage entities is not available, and any specific one of the SD2 plus RL2 second-level storage entities of each available first-level storage entity is not available.

\* \* \* \* \*